United States Patent
LaRue et al.

(10) Patent No.: US 10,282,628 B1
(45) Date of Patent: May 7, 2019

(54) SYSTEM FOR PRODUCING CAMOUFLAGE PATTERN BASED UPON PERCEPTION MACHINE VISION

(71) Applicants: Joshua LaRue, Bertram, TX (US); Christopher Eusebi, Bloomfield Twp., MI (US)

(72) Inventors: Joshua LaRue, Bertram, TX (US); Christopher Eusebi, Bloomfield Twp., MI (US)

( * ) Notice: Subject to any disclaimer, the term of this patent is extended or adjusted under 35 U.S.C. 154(b) by 228 days.

(21) Appl. No.: 15/484,104

(22) Filed: Apr. 10, 2017

Related U.S. Application Data

(60) Provisional application No. 62/320,396, filed on Apr. 8, 2016.

(51) Int. Cl.
| | |
|---|---|
| G06K 9/20 | (2006.01) |
| G06T 11/60 | (2006.01) |
| G06Q 30/06 | (2012.01) |
| G06F 17/30 | (2006.01) |
| G06F 16/58 | (2019.01) |

(52) U.S. Cl.
CPC ....... G06K 9/2081 (2013.01); G06Q 30/0621 (2013.01); G06T 11/60 (2013.01); G06F 16/5866 (2019.01); G06F 17/30268 (2013.01); G06T 2200/24 (2013.01)

(58) Field of Classification Search
None
See application file for complete search history.

(56) References Cited

U.S. PATENT DOCUMENTS

| | | | |
|---|---|---|---|
| 8,971,661 B2* | 3/2015 | Maloney | F41H 3/00 382/276 |
| 9,322,620 B2* | 4/2016 | Maloney | F41H 3/00 |
| 2002/0090131 A1* | 7/2002 | Alden | G02B 26/06 382/154 |
| 2004/0134138 A1* | 7/2004 | LaRue | F41H 3/00 52/169.1 |
| 2010/0232029 A1* | 9/2010 | Lewis, Jr. | A01M 31/025 359/629 |
| 2010/0234106 A1* | 9/2010 | Kojima | A63F 13/10 463/31 |
| 2012/0318129 A1* | 12/2012 | Jackson | F41H 3/00 89/36.02 |
| 2013/0163867 A1* | 6/2013 | Cincotti | G06T 11/60 382/167 |
| 2014/0242358 A1* | 8/2014 | Tarrell | A41D 31/0011 428/196 |
| 2014/0347699 A1* | 11/2014 | Maloney | F41H 3/00 358/2.1 |
| 2015/0116321 A1* | 4/2015 | Fortner | F41H 3/00 345/420 |
| 2017/0350676 A1* | 12/2017 | Bender | F41H 3/00 |

* cited by examiner

*Primary Examiner* — Tahmina N Ansari
(74) *Attorney, Agent, or Firm* — Lorenz & Kopf, LLP

(57) ABSTRACT

A method and system for evaluating camouflage patterns with statistically significant effectiveness in various environments and for using a genetic algorithm to produce an improved camouflage patterns.

23 Claims, 13 Drawing Sheets

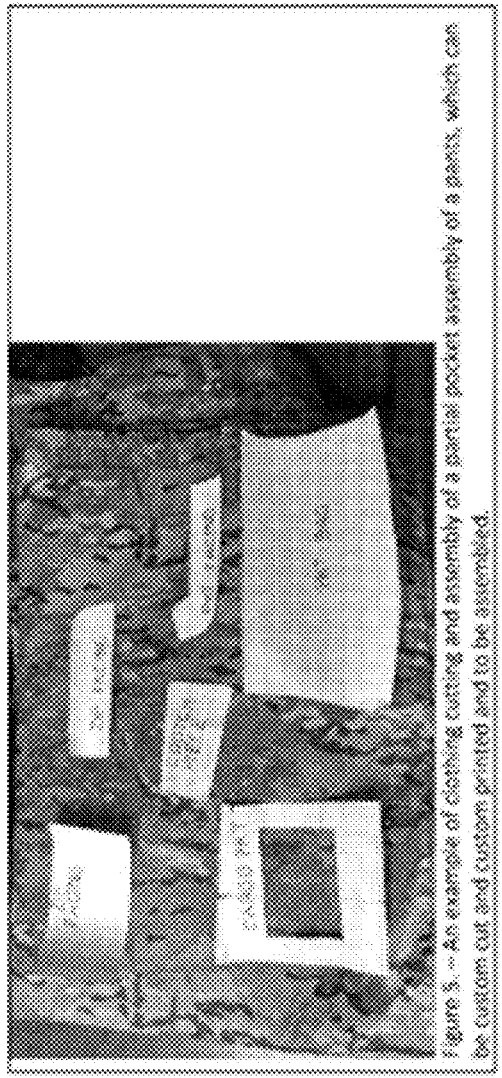
Figure 5 — An example of cloning, cutting and assembly of a partial pocket assembly of a pants, which can be custom cut and custom printed and to be assembled.
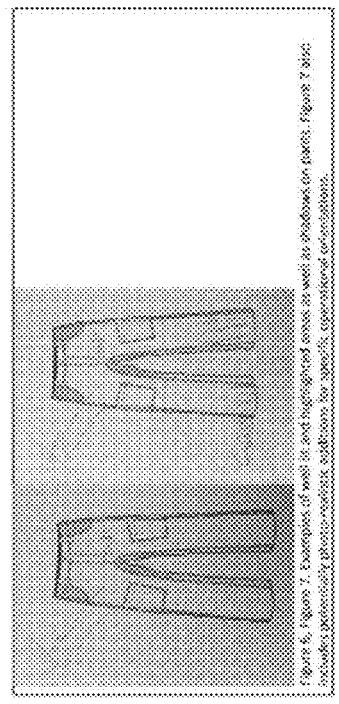
Figure 6a

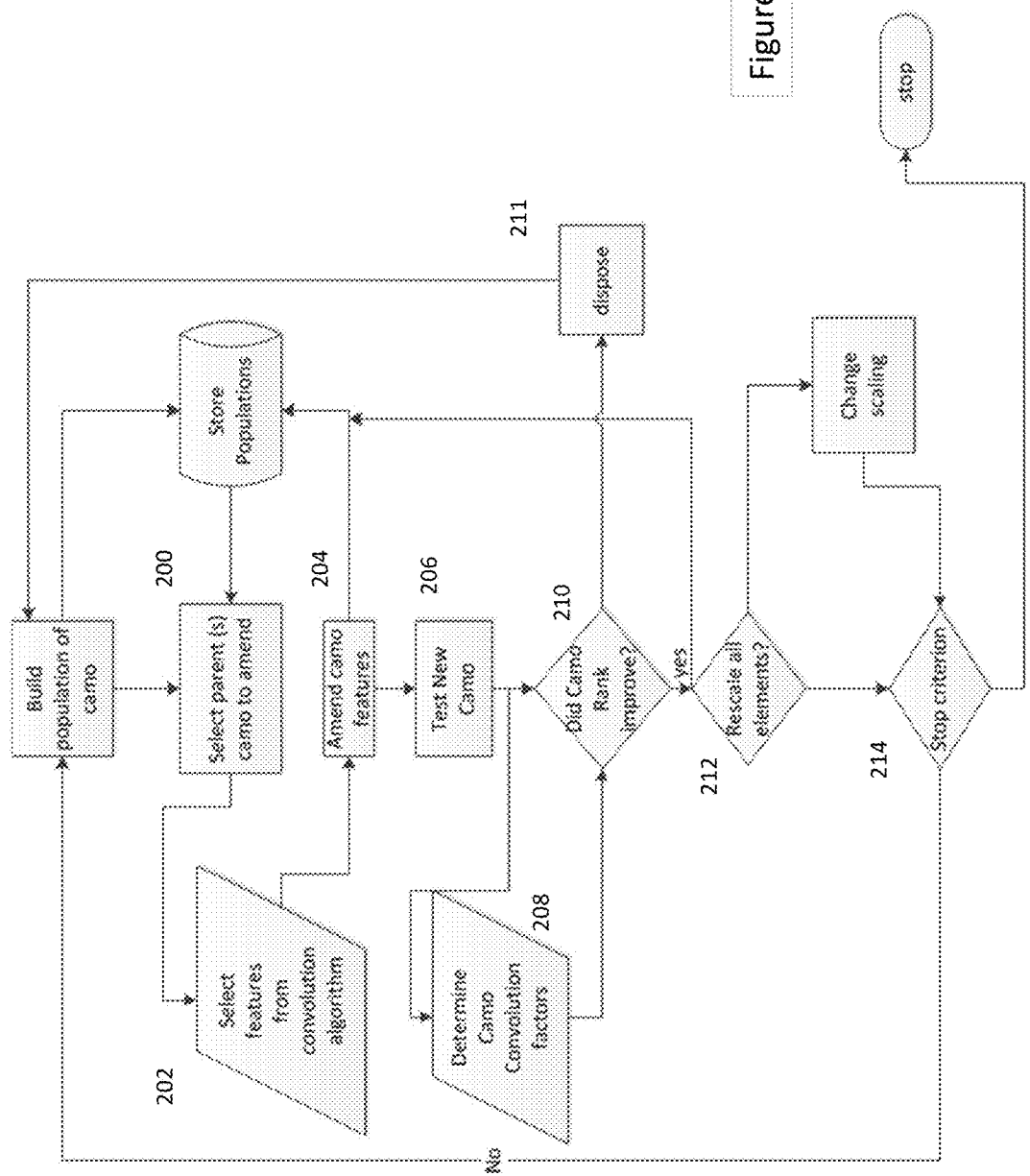

SYSTEM FOR PRODUCING CAMOUFLAGE PATTERN BASED UPON PERCEPTION MACHINE VISION

CROSS-REFERENCE TO RELATED APPLICATIONS

This application claims the benefit of U.S. Provisional Application No. 62/320,396, filed on Apr. 8, 2016. The entire disclosure of the above application is incorporated herein by reference.

FIELD

The present disclosure relates to a multi-tiered system that encompasses system for evaluating camouflage and more particularly a complex test and evaluation research methodology that evaluates camouflage patterns with statistically significant effectiveness in various environments and for using a genetic algorithm to produce an improved camouflage pattern.

BACKGROUND

This section provides background information related to the present disclosure that is not necessarily prior art. The camouflage industry has had specialty designers that work in small groups of experts, and do minimal, low quantity testing of patterns and colors in narrow use cases and with only very specific backgrounds and environments. This can lead to patterns being developed that are trendy, but not particularly effective, or the use of patterns and colors that do not work well with a given environment. Past survey or quantitative research may have been so low volume to be within a sampling error, given the narrow scope of testing. Some embodiments can rank patterns and backgrounds based on amount of response variation and the statistical significance of the results with a large and ever-growing sample size.

As depicted in FIGS. 1-3, currently each pattern and color is developed to specifically match a narrowly defined environment and season, and outside of that focused testing, the pattern can, in many cases, be substantially less effective.

Among consumers, especially aspirational or non-professional consumers, many patterns are selected for purely aesthetic or fashion reasons, i.e. "they look cool" or their friends have them, and not because there is a measured accuracy of a low failure rate against their particular operating environment. These camouflage pattern, while tests, are not optimized to decrease the chance of observation.

SUMMARY

This section provides a general summary of the disclosure, and is not a comprehensive disclosure of its full scope or all of its features.

The system for determining an effectiveness of a particular camouflage pattern has a non-transitory computer-readable medium storing computer-executable instructions for determining an effectiveness of a particular camouflage pattern. The instructions executable by a computing machine. The system includes a display which displays a background of a user interface comprising a first image. The display displays a foreground of the user interface having a second image, wherein the second image includes the particular camouflage pattern. The system includes a first selection from a first user via the user interface, wherein the first selection is received at a first location and at a first time, and wherein the first selection is indicative of a first user-perceived location of the second image relative to the first image. A first user statistic associated with the first selection is calculated. A first effectiveness of the particular camouflage pattern based on the first user statistic is calculated and stored.

The system further includes instructions executable to calculate the first user statistic based on a delay between a start time when the second image is displayed in the foreground and the first time. Optionally, the first image and the second image are displayed simultaneously. Incorporated in the memory are instructions executable to calculate the first user statistic based on the first location within a boundary of the second image where the first selection is received. The particular camouflage pattern can be determined to have a decreased effectiveness when the first location is near a center of the second image. The effectiveness of the particular camouflage pattern correspondingly varies with a separation distance between the first location and a center of the second image. Optionally, the particular camouflage pattern is determined to have an increased effectiveness when the first location is within the second image and near the boundary of the second image.

The particular camouflage pattern can be determined to have an increased effectiveness when the first location is outside of the second image. The first image from an image sensor that is in wired or wireless communication with the computing device. The first image is transmitted to a plurality of other computing devices. Optionally, a second user statistic associated with a second selection received from the second user via a second user interface associated with one of the plurality of other computing devices is calculated. The second selection is received at a second location and at a second time, and wherein the second selection is indicative of a second user-perceived location of the second image relative to the first image. The system uses instructions executable to determine an effectiveness of the particular camouflage pattern based on the second user statistic.

Optionally, the instructions executable to determine an effectiveness of the particular camouflage pattern based on the first and second user statistics. The instructions are executable to provide an internet link for purchasing an item that includes the particular camouflage pattern based on the first effectiveness determined for the particular camouflage pattern. Optionally, the instructions are executable to determine a first geographical location associated with the first image. According to another teaching, optionally, the instructions are executable to a first seasonal effectiveness of the particular camouflage pattern based on metadata associated with the first image.

According to another teaching, optionally, the instructions are executable to a first seasonal effectiveness of the particular camouflage pattern based on the first determined effectiveness and the first geographical location associated with the first image.

According to another teaching, optionally, the instructions are executable to a first seasonal effectiveness of the particular camouflage pattern based on the determined first effectiveness and first demographic information associated with the first user.

According to another teaching, optionally, the instructions are executable to a first seasonal effectiveness of the particular camouflage pattern based on the effectiveness of the particular camouflage pattern and of first seasonal information associated with the first image.

According to another teaching, optionally, the instructions are executable to a first seasonal effectiveness of the particular camouflage pattern based on first seasonal information associated with the first image including at least one of a time and date when the first image was taken.

According to another teaching, optionally, the instructions are executable to a first seasonal effectiveness of the particular camouflage pattern based on design a manufacturable camouflage pattern based on the first effectiveness of the particular camouflage pattern.

According to another teaching, optionally, the instructions are executable to a first seasonal effectiveness of the particular camouflage pattern based on order an article comprising the manufacturable camouflage pattern.

According to another teaching, a method for determining a geographical effectiveness of a particular camouflage pattern, the method includes receiving, with a computing device, a first image from an image sensor in communication with the computing device. A background of a user interface is displayed, where the background comprises the first image, and wherein the first image includes metadata associated with a geographical location where the first image was captured. A foreground of the user interface is displayed, where the foreground comprises a shape that includes a particular camouflage pattern. A first user selection from a first user via the user interface is obtained, where the first user selection is indicative of a first user-perceived location of the second image relative to the first image. A first user statistic is calculated for the first user associated with the first user selection. A first effectiveness of the particular camouflage pattern based on the first user statistic and the first geographical location where the first image was captured.

According to an alternate teaching, a system for determining a demographical effectiveness of a particular camouflage pattern, includes, a computing device comprising processor resources and memory resources, the memory resources storing computer-readable instructions that, when executed by the processor resources, cause the processor resources to: display a background of a user interface comprising a first image; display a foreground of the user interface comprising a second image, wherein the second image is of a particular camouflage pattern; receive a user selection from a user via the user interface, wherein the received selection is indicative of a user-perceived location of the second image with respect to the first image; calculate a first user statistic for the first user associated with the received selection, wherein the user statistic is based on where within a boundary of the second image the user selection is received; receive a user demographic associated with the user; and determine a demographical effectiveness of the particular camouflage pattern based on the user statistic and the user demographic.

According to another teaching, optionally, the instructions are executable to determine a first seasonal effectiveness of the particular camouflage pattern based on method, system, and apparatus for designing and/or constructing camouflage as discussed herein.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 5-6c represent the formation of clothing using camouflage created according to the present teachings;

FIGS. 8-12 represent flow charts of the methods used to determine the effectiveness of the camouflage pattern.

Corresponding reference numerals indicate corresponding parts throughout the several views of the drawings.

DETAILED DESCRIPTION

Figure 1:
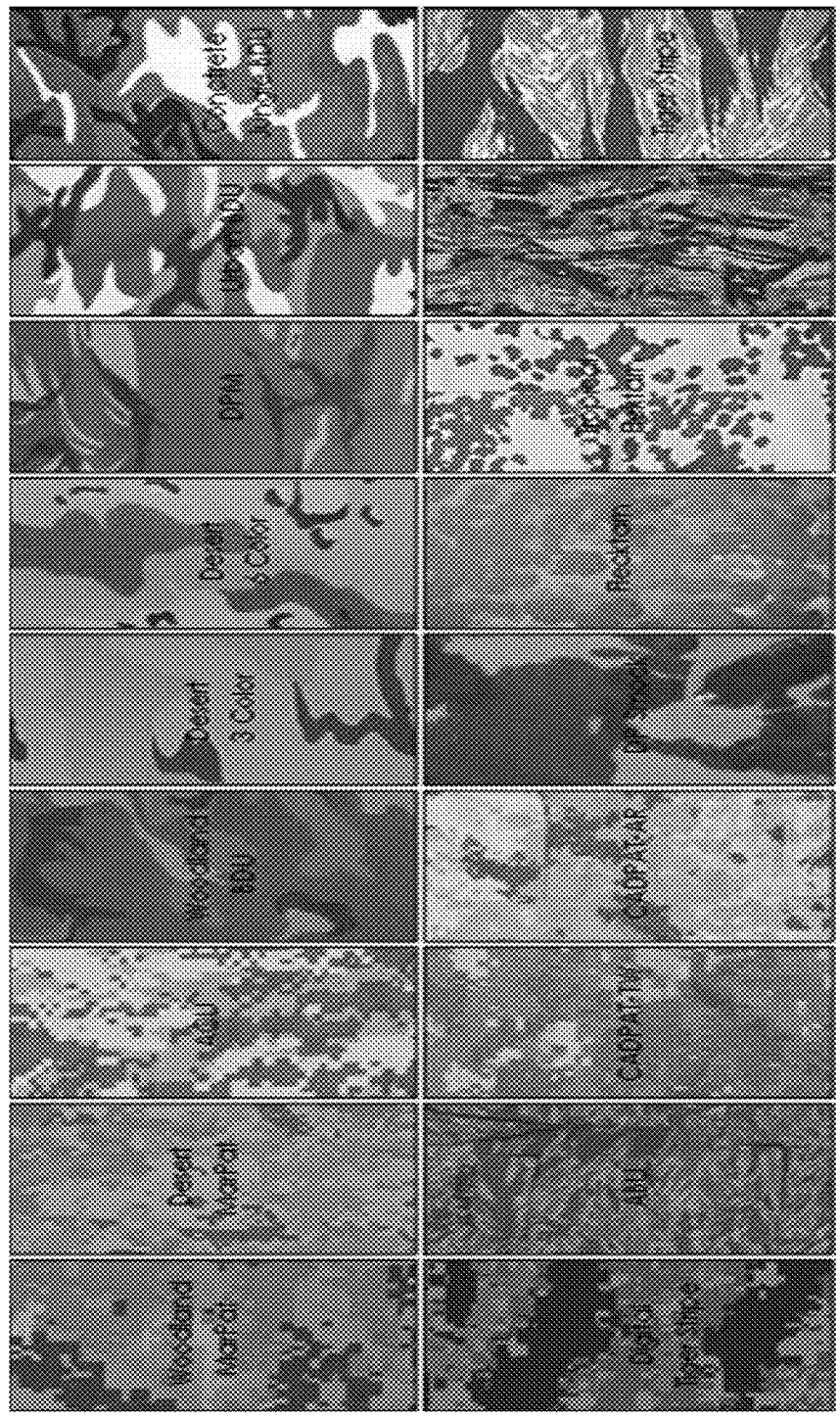
FIGS. 1-3 represent prior art camouflage systems.
Figure 2:
Figure 3:
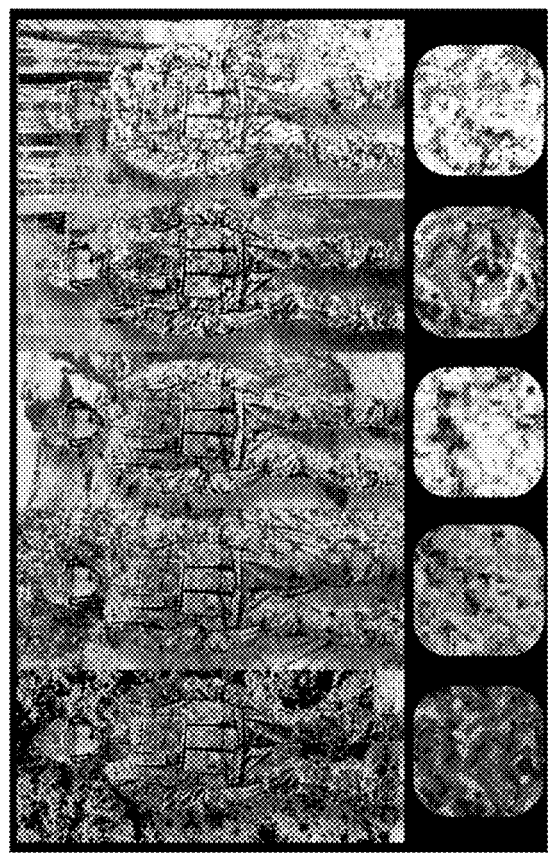

Example embodiments will now be described more fully with reference to the accompanying drawings.

Depicted in FIGS. 1-13 is a system 100 to identify squares/swatches of camo patterns or colors placed on photos of natural backgrounds is taught. Optionally, the system 100 is available on iPhone, Android, Facebook, website-based, native PC and Mac applications. The system 100 can include instructions executable by a computing device to perform a number of functions, such as display a background of a user interface comprising a first image. In some embodiments, the user interface can include a display and/or touchscreen and/or input/output mechanisms for interfacing with a computer-based control unit including, for example, one or more of a keyboard, a mouse, a tablet, a foot pedal, a switch, microphone, and/or the like. A variety of camouflage patterns and colors can be shown from popular consumer patterns, to historic or current military from worldwide sources. In some embodiments, camouflage patterns can be defined as geometric shapes, naturally occurring patterns, solid colors, etc. In some embodiments, instructions can be executed to display a foreground of the user interface comprising a second image, wherein the second image comprises the particular camouflage pattern. The second image can be of an object, in some embodiments. For example, the second image can be of a person, a vehicle, animal, a particular shape, etc.

A naturally occurring pattern section can be available, from fish, sharks, cats, cuttlefish, insects, etc., which can be used as the camouflage pattern and/or a part of the camouflage pattern. Photos are of all types of terrain from all over the world, and each environment is tracked, so gee-location and season data can be accessed as well. Camo-to-background presentation can be randomly matched and placed over the background to simulate that pattern in that environment. Some matches are obvious and easy to spot due to placement, matching, contrast or poorly designed patterns.

Upon execution, a registered user is presented with a scene and is timed to touch/click the area of the screen with the "camo swatch". Turn is scored for accuracy—touching the center of the swatch or misidentifying the pattern and touching an area without the pattern (a success for the pattern and environment match). Turn is scored for time—how long it takes to select the correct area. Each "round" of system use is 15-20 matches/turns and there are scoring and rewards for accuracy and time in an example. Each session of system use can be 3-4 rounds of 10-20 turns each, averaging 10 minutes of use at a time in an example. Points and levels with offline prizes for cumulative scoring—iPads, Camo Gear, etc. and discounts on camo and tactical gear from partners and advertisers.

The Audience is built via marketing of exciting and unique system use, and also training and skill-building in identifying concealed items. users are ranked as Spotters/Recon levels. Offering bonus points for users adding new background/test images to compare can both grow the background gee-located database, AND encourage ongoing personal engagement. Leaderboards and sharable levels and status circulate scoring among friends. users can recruit friends to their clan, military-like "Fire Team" or their "hunting buddies" to assist in scoring against other teams, which also have leaderboards to foster sharing and competition. Online and offline advertising can acquire new users. Email of new real-world prizes and system notifications can keep user interest and weekly up.

The testing model is a high time-to-choice and frequent failure to identify the exact center of the swatch across multiple groups of users in the same timeframe and geography can demonstrate a positive state of visual camouflage with statistically significant confidence in results. The higher the users scores for a pattern across multiple geo and seasonally related backgrounds the poorer the match of camo to environment. With user registration and geolocation data, embodiments of the present disclosure can identify the user's location and yearly season, then based on systemplay success/failure rates, determine the most successful camo patterns for a projected season/timeframe.

Primary measure of pattern is "Time to Failure"—duration to find pattern placed on image. "No Failure"—no selection, then increase rotation in matches. Geo-specific successful camo matches vs a broad match—gee-belts of effective camo, break down the globe into areas to be. Seasonal—geo to broad, areas of effectiveness. User Scoring: a cumulative score of successfully selecting and time associated with selections. Not visible versus not identifiable—In subsequent phases, the swatch may be replaced with physical objects that have been scaled and placed on environments—this can help test camouflage that just obscures features or makes objects unidentifiable, but they may still be seen (like zebra stripes or dazzle patterns). System versions should be produced for multiple platforms, Facebook, iOS/iPhone/iPad, Android, etc. Individual personal information from Facebook or via system profiles can show demographic information such as age, gender, interests, likes/brand engagements, race and precise geography via geolocation.

User submissions of camouflage patterns and backgrounds can be solicited and encouraged—These submissions from users can be tagged with location and date of image, so season and geography could be captured and added to the analysis. Research organizations and commercial camouflage providers can offer their test patterns or unique placement challenges for testing within the systems without disclosing their sponsorship/affiliation. Partners offer current or projected patterns for evaluation by system users in a targeted strategic area—i.e. testing current patterns with users in NW winters vs SW summers. In addition, system users can take photos of their local hunting/operating 5/20 areas and add them to the system to be evaluated by themselves, their friends/group or even the full system community. All photos from phones, tablets or computers can be added with required geography/GPS data, date of image, time of day and user and other meta information. In some embodiments, information associated with a photo can be user entered, such as location information, time of day, etc. These user-submitted environment photos can be added into the camouflage testing rotation, along with their meta information so full testing data can be compiled and results of different camouflage be compared.

The unique matching and measurement of patterns and backgrounds can be managed by customized software which can begin by randomizing matches, and as tests mature and more scores/evaluations are available, they can be precisely match tested to ensure critical findings are provided.

Examples include: A specific pattern can be tested and reported on effectiveness for American males in the US State of Louisiana. A dozen new patterns from a US company can be tested and embodiments can demonstrate effectiveness by scenery type and by region. Embodiments of the present disclosure can learn unique perspectives of Asian or Western European audiences on pattern matches.

With System Profile information embodiments of the present disclosure can also learn about specific effect based on demographics such as gender, race, age, geography, etc. Embodiments of the present disclosure can rank patterns and backgrounds based on amount of response variation and the statistical significance of the results with a large and ever-growing sample size. By reviewing in-depth information and analysis of systemplay and comments, insights as to the development of patterns, products and evaluations can be learned and monitized.

Valuable insights to retailers that enable them to stock and target consumers with the message that these patterns and colors are "certified effective" in this area: "You should advertise these patterns here, because they work the best in this area and season." Embodiments of the present disclosure can develop a certification program, and the results of patterns and products using patterns in specific geographies/regions in specific seasons can be evaluated and published. "CamoSystem Certification for West Texas"—retailers can include their patterns in evaluations and an effectiveness rating can be compiled and published—First, Second, Third places Certified Effective in this area/geography. The US Department of Defense, related agencies or other research organizations can offer their test patterns or unique placement challenges for testing within the systems. These pattern submissions can be tested without disclosing the providing agency. DOD can offer current or projected patterns for evaluation by system users in a targeted strategic area—for example; testing current patterns with environments and native system users in Western Europe or Asia for insights into possible physical, cultural or other environmental differences.

Advertising sales to corporations that want access to a valuable targeted audience—18-45 year old males using the system frequently, project high monthly-average users—MAUs. Research fees to camouflage and clothing manufacturers—multi-billion dollar industries. Uniquely successful camo pattern licensing to clothing manufacturers.

Pattern (e.g., camouflage pattern)—commercial, military, historical, animal, plant, fractal. Color and color combinations. Positions on background—software can detect sky, water or other noncompatible areas and not place patterns over them. Orientation—vertical, horizontal, diagonal. User platform—Phone, Tablet, Computer-screen size, interface tools (fingers, mouse). In some embodiments, a higher weighting can be assigned to results obtained from a user using the system on a larger user interface (e.g., tablet) versus a user using the system on a smaller user interface (e.g., phone). In an example, a particular pattern (e.g., image) may be displayed as larger on the tablet versus the phone and may provide a user an opportunity to more accurately select the larger pattern with their finger. For example, a finger tap received via a tablet interface may be contained within boundaries of the particular pattern versus a finger tap received via a phone interface, which can exceed the boundaries of the smaller displayed pattern.

Data stored with associated images includes user success or failure rates, time. Photo geography—city, region, state, country, continent meta data. Photo date and season—Spring, Summer, Fall, Winter—Snow, dessert/rocks, vegetation levels, Frequency of success across high quantity of users. Variation in user success and time with live result sets. Ongoing re-testing to produce higher confidence, same user/partner/environment multiple tests with both successes and failures. User demographics such as age, sex, race, nationality, economic status, level of education, employment, income level, etc.

Figure 4A:
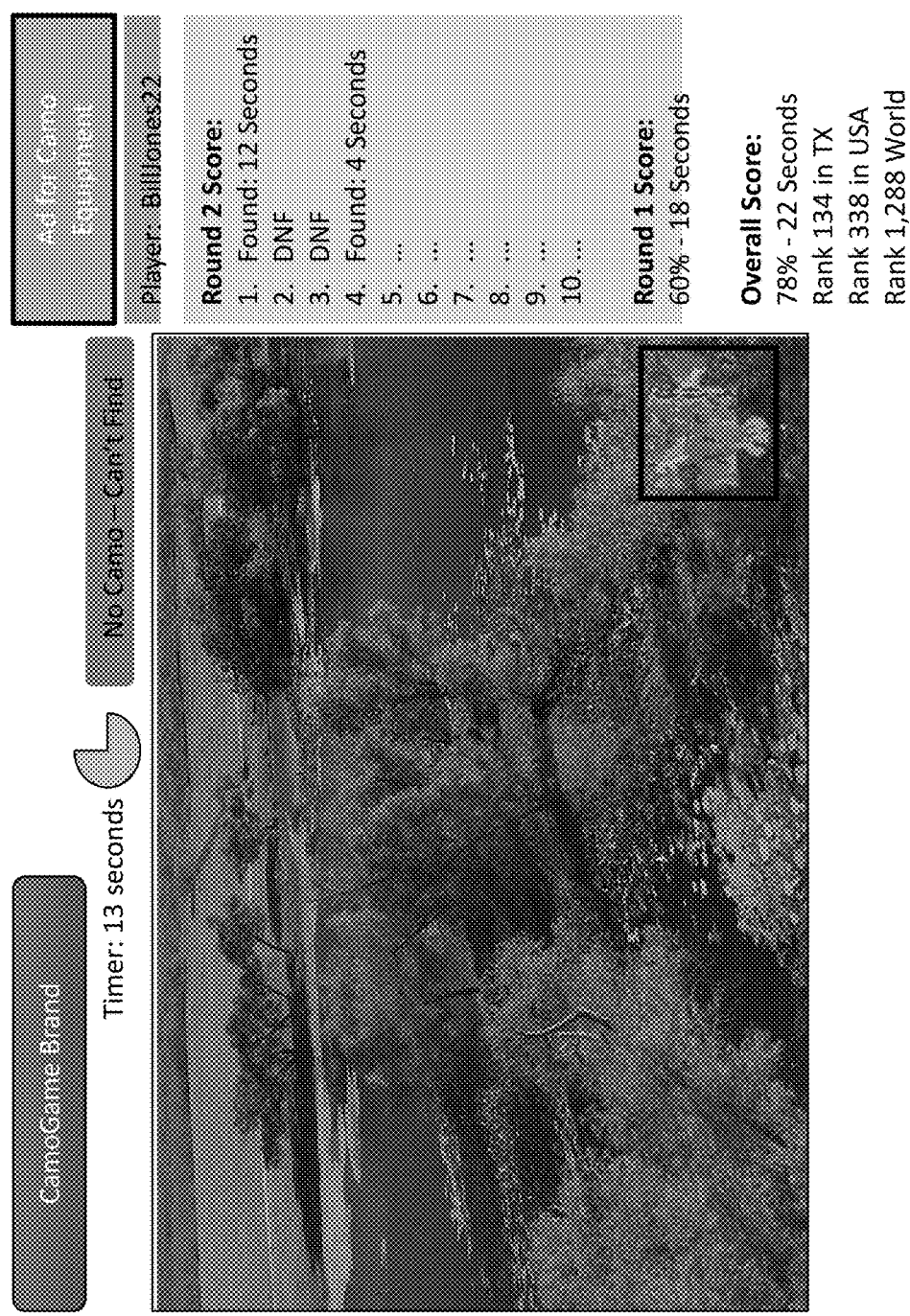
FIGS. 4a-4c represent a graphical user interface for the camouflage evaluation and creation system according to the present teachings.
Figure 4B:
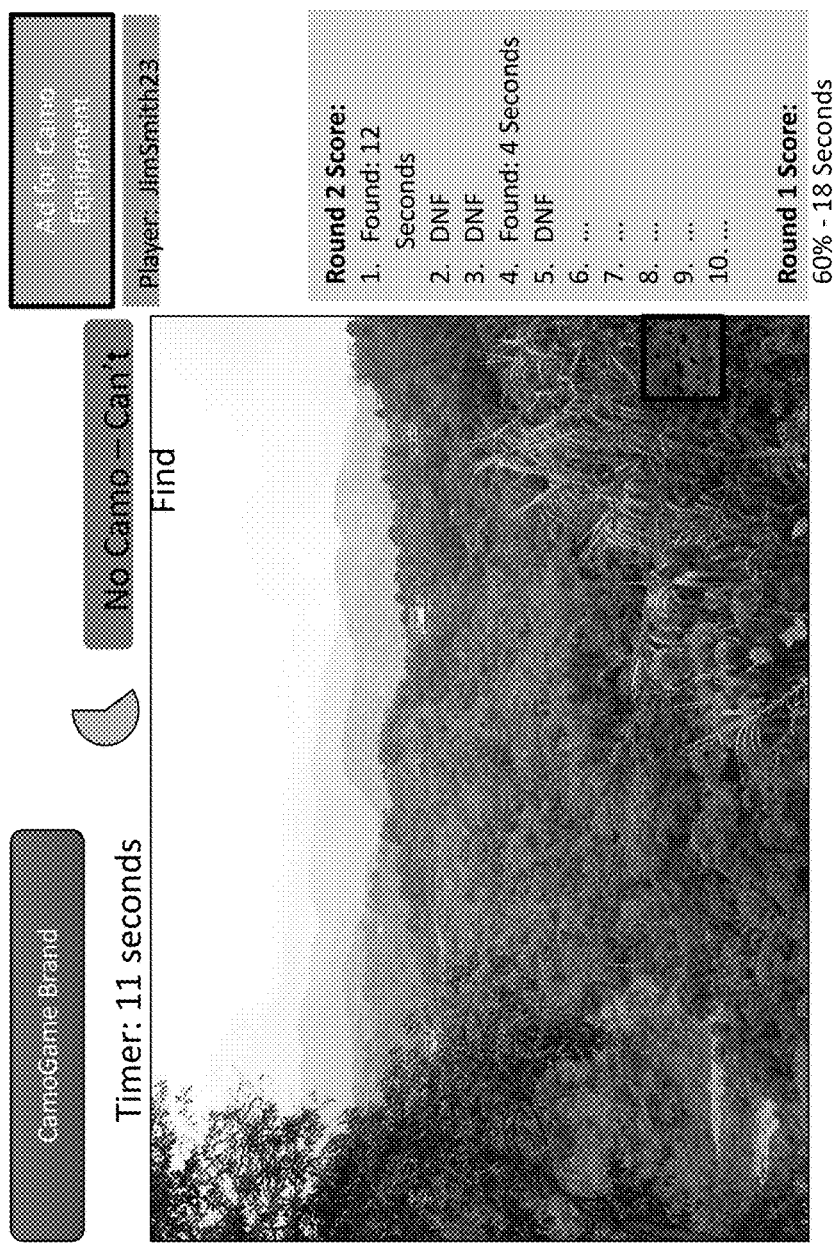
Figure 4C:
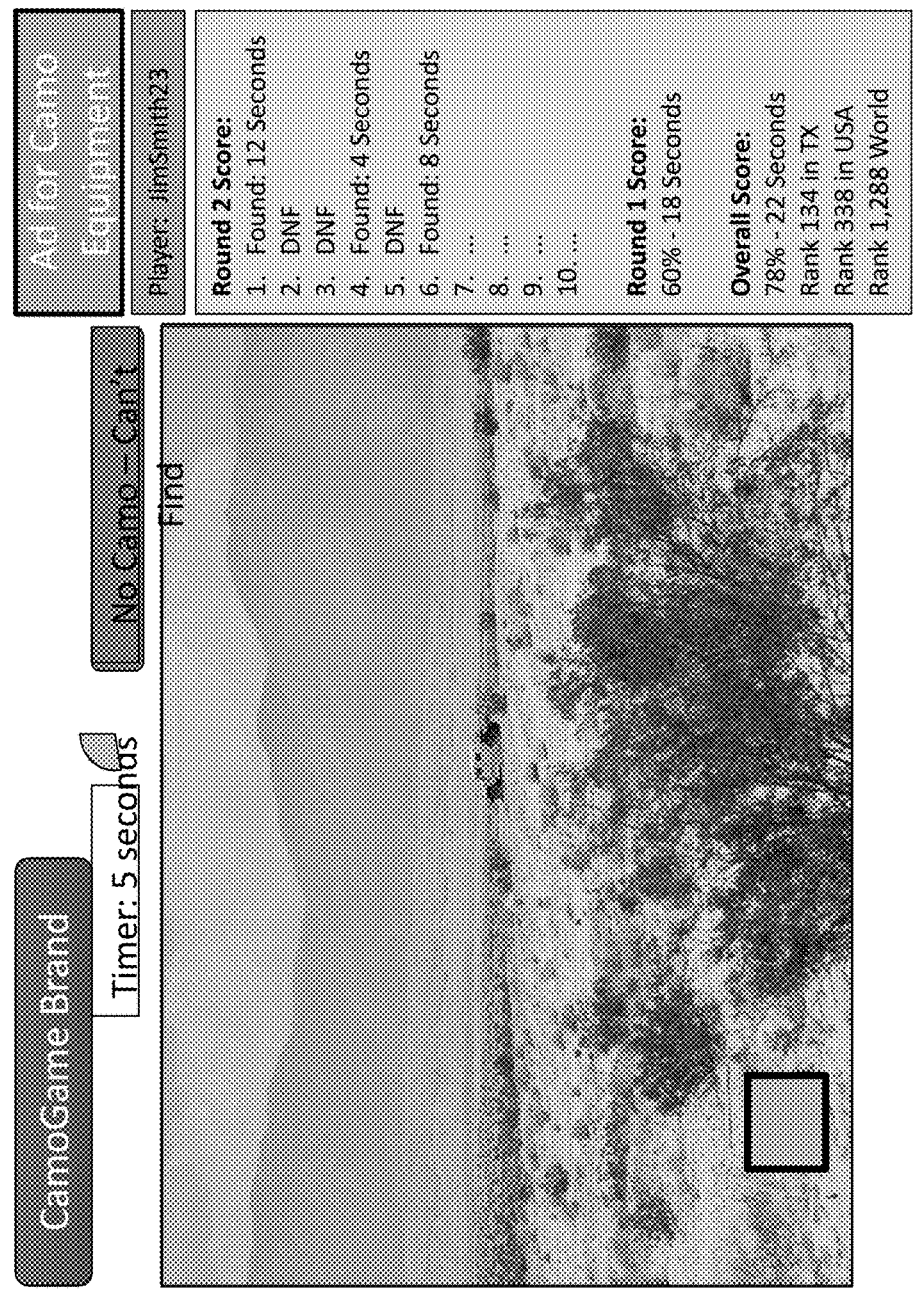

FIGS. 4a-4c, depict a user interface of a full sized application, with timer, Can't Find button, Rounds, Scoring and remaining us. The Camo Evaluation Core Technology can include the matching algorithms and large data sets of matching evaluations, timing, geographies, users and demographics, which all can be centrally located in a company data center and/or across a distributed computing network, for example. Apple iOS application that runs on iPhone, iPad and iWatch platforms. Android OS application that runs on Android phones and tablets. Apple Macintosh Application that runs on Mac computers. Windows 10 application.

As described in further detail below, the background images 102 are presented having inserted camouflage sample 104 are placed in the image for detection. The camouflage sample 104 can be located randomly at any position on the background images 102. Alternatively, properties such as color frequency camouflage sample 104 can be used to determine likely successful locations for the camouflage sample 104 on the background images 102. In this regard, the background image can be partitioned using machine vision techniques to evaluate portions of the on the background images 102.

A series of software programs and a central server that adds camouflage patterns, color patterns or images of plant/animal natural camouflage over environmental images in a matrix of pairing. Matching can be random initially, then can be: influenced by successful finds, high-time-finds and did-not-finds. Then change positioning and orientation of the pattern on the environment, continue in rotation to new users and current evaluators. With did not finds, increase quantity of matches in rotation to that user and to other users. If the "match" continues to have high-time-finds and did-not-finds, then the scoring is increased and similar environments from the geography and season can be tested for improved significance and confidence in a successful pairing.

In addition to using the testing methodology to determine color matching and pattern matching, based on successful testing (failure to identify), embodiments of the present disclosure can test to determine above/below counter shading opportunities, seasonal and/or weather variation, side and/or thayer countershading, and/or above/below countershading for an article. Embodiments of the present disclosure can also be used to construct a camouflage pattern for an article based on the above/below counter shading opportunities, seasonal and/or weather variation, side and/or thayer countershading, and/or above/below countershading. Some embodiments can evaluate variations in colors and shades that can better match views from above, or standing or prone positions on equipment or personnel in patterned clothing. For example, an adaptive camouflage pattern can be designed for an article, based on an orientation, position, and/or presence of the article with respect to environmental factors, which can include, for example, the sky, landscape, vegetation, sun, time of day. Some embodiments of the present disclosure can take into account an angle of the sun and/or lighting source with respect to the article. In some embodiments, an article can be an article of clothing (e.g., pants, shirt, hat, gloves), accessory (e.g., backpack, chest rig, etc.), vehicle (e.g., airplane, boat, truck, tank), weapon, or other type of object that can or typically comprises a camouflage pattern. In an example, embodiments of the present disclosure can evaluate variations in colors and shades that can better match a view of an individual from the front, who is standing. For instance, a camouflage pattern can be designed for the individual that includes a shaded crotch, shaded arm pits, etc.

Those evaluations can then be used to specify custom designed, manufactured and printed clothing or equipment, that has patterns, colors and counter shading, concealment of shadow and matching specifications to increase effectiveness of camouflage in specified environments.

In some embodiments, the typical orientation of a person (prone or standing/crouching) could be photographed to determine highlights and shadows while in this orientation, and over a specific environment. A software application can then analyze, interpret, and use the matching intelligence data to design a printing and cloth pattern cutting design. This can apply different color shades or even variations in patterns to counter shade common dark/light areas, prior to sewing assembly of the clothing or equipment.

Figure 6C:
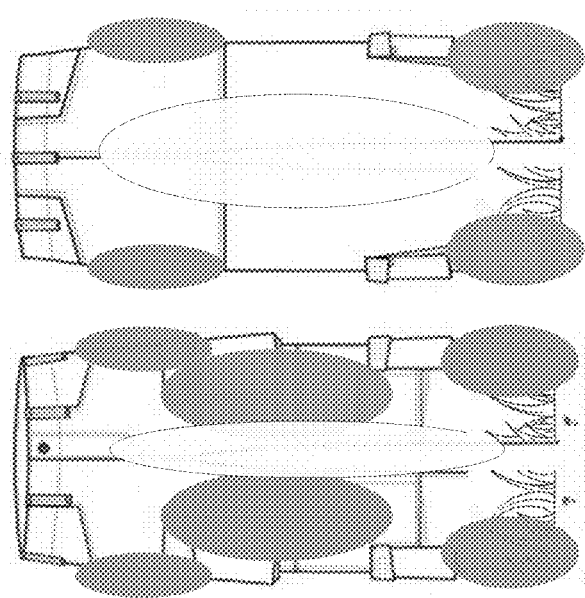

Unlike the pre-printed camouflage material and pattern overlays/cuts as in FIG. 5-6c, embodiments of the present disclosure can have a complementary base color but have no patterns. The design can include variances in colors, pattern types, cut sizes or even photo-realistic elements such as grass or rocks in designed areas. The areas between cut and printed patterns can be unprinted and can, for example, have no patterns associated therewith, decreasing the amount of printed ink needed to make intelligent bespoke camouflage.

In an example, a grid can be assigned to a three-dimensional model that can be produced by the software application. Various colors, color shades, pattern types, cut sizes, and/or photo-realistic elements can be assigned to each sector of the grid. In some embodiments, each sector of the grid can be filled in with a statistically validated pattern (e.g., certified of a particular effectiveness), as further discussed herein. In some embodiments, the grid can be applied to a piece of fabric and can be used to outline various swatches of the fabric, which can be used to construct the various portions of the article. For example, the three-dimensional grid can be transformed into a two-dimensional grid and used for patterning individual shapes of the fabric that can be used to construct the article and also color, pattern, etc. associated with each shape of fabric. In some embodiments, the initial piece of fabric can be a blank (e.g., have a pattern other than that associated with the individual patterned shapes, have a generic pattern as further depicted in Appendix A) and the individual shapes can be printed on the blank, as discussed herein.

In an example, shoulders which are sunlit, can be printed and assembled as a series of darker shades and complex patterns, while armpits or crotches which are shadowed and crumpled, can be printed and assembled with lighter colors and simpler patterns. This custom design and assembly could be applied to personal clothing and equipment, such as backpacks or other tactical gear. The sunlit areas are cut and made into a pattern with a series of patterns and shades inside of those pieces. For example, a three dimensional grid can be constructed for a backpack and one or more sectors of the grid can be filled in with a pattern of camouflage that has been statistically validated (e.g., certified), as discussed herein. For instance, a bottom of the backpack can be of a simpler design and/or a lighter shading than a top portion of the backpack that is more directly exposed to light. The three-dimensional grid can be transformed to a two dimensional piece of fabric and the various swatches needed to construct the backpack can be printed onto the piece of fabric and then cut out to assemble the back pack.

Accordingly, an article (e.g., piece of clothing, camouflage pattern for a piece of equipment) can be designed and manufactured to include a particular camouflage pattern in accordance with embodiments of the present disclosure and certified with a particular effectiveness for a particular geographic region, which can be effective in terms of not being distinguishable in a particular landscape of the geographic region by a particular demographic, during a particular time of day. Although fabric is discussed herein, embodiments of the present disclosure can be used to design a camouflage pattern which can be implemented as a vinyl wrap, via paint, or other types of mediums.

Figure 6B:
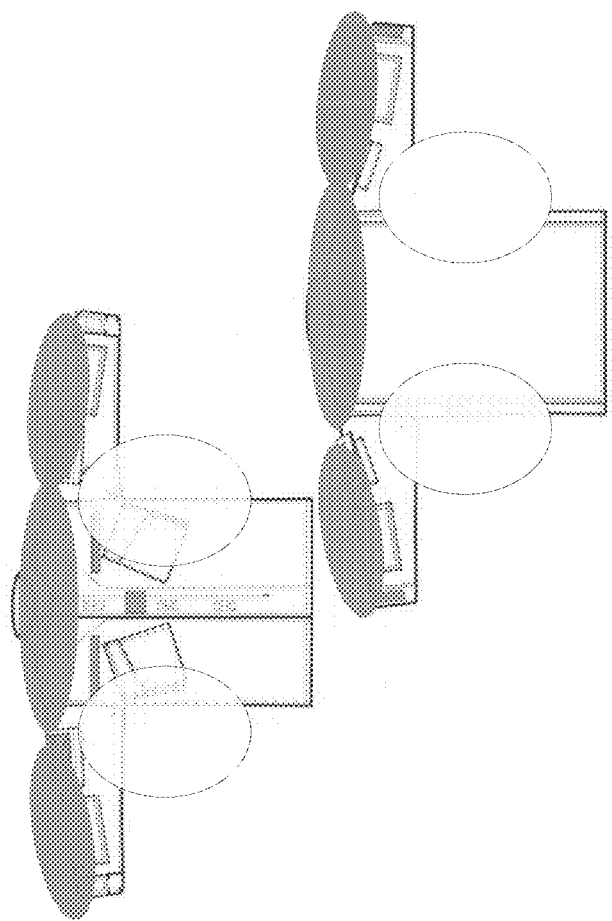

FIGS. 6a-6c are examples of clothing cutting and assembly of a partial pocket assembly of a pants, which can be custom cut and custom printed and to be assembled. Examples of well-lit and highlighted areas as well as shadows on pants. FIG. 6c also includes potentially photorealistic additions for specific operational orientations.

Color matching can be defined as having similar colors to the environment or nearby areas. The camouflage can be effected by above/below countershading: can be defined as having different colors or patterns above and below, to camouflage the upper side for observers from above, and the underside for observers from below. Seasonal or weather variation: can be defined as having coloration that varies with season or environmental changes, spring, summer, fall, winter, snow, wet areas. Side or Thayer countershading: can be defined as having graded toning from dark above to light below, so as to cancel out the apparent effect of self-shadowing when viewed from the side.

Above/below countershading: can be defined as having different colors or patterns above and below, to camouflage the upper side for observers from above, and the underside for observers from below. Some embodiments of the present disclosure can show which patterns can produce the best results and increase time-to-detection of user's equipment with these patterns. Some embodiments can provide direct links to purchase equipment with those patterns. Some embodiments can provide an active gaming platform for advertisers interested in connecting with a valuable audience. Some embodiments can provide highly confident insights into the performance of specific camouflage patterns and colors in specific environments.

Some embodiments of the present disclosure can rank patterns and backgrounds based on amount of response variation and the statistical significance of the results with a large and ever-growing sample size. In contrast, other approaches have been smaller sample sizes and have not involved consumer systemplay with a large, diverse audience nor driven to gather information via dynamic matching, gee-location, user profiling and tracked quantitative testing to the high level of statistical significance.

Figure 7:
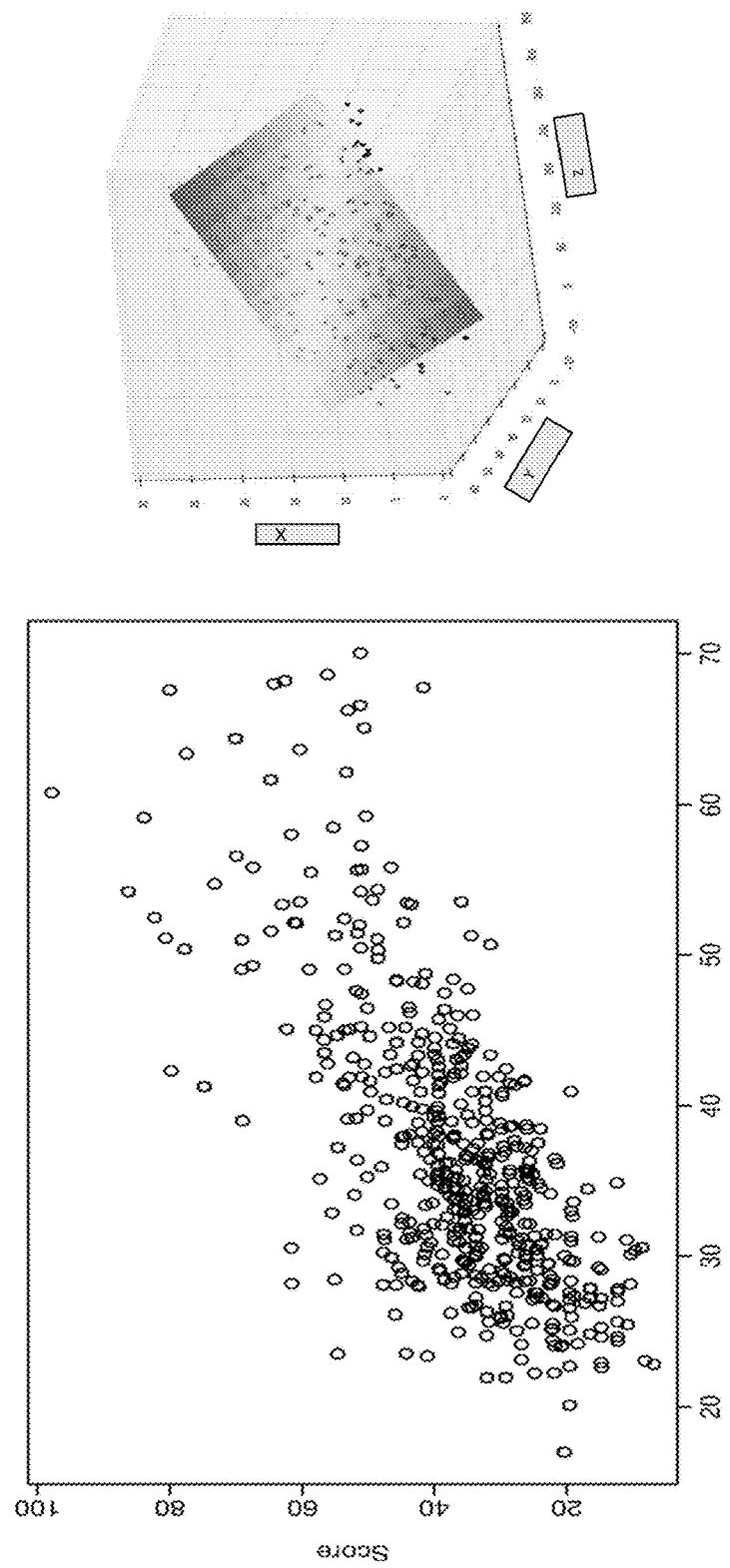
FIG. 7 represents a statistical analysis of camouflage tested using the system.

As shown in FIG. 7, depicts the statistical evaluation & analysis of the patterns which are evaluated for effectiveness and compared to user demographics. This can include, user Data—Age, Gender, Interests (hunting, military, etc.), Location, Urban/Rural, Device, Experience, Ranking, and Time to identify pattern and placement camouflage on the background images. This can include the distance from edge of screen, surrounding color immersion score, night/day/dusk dummy variables, distance, and size. A multivariate effectiveness analysis is used to determine unbiased effectiveness scores for each pattern. The multivariate analysis will provide detailed analysis for each pattern; standard deviation, confidence intervals, etc.

Multivariate analysis processes are statistical analysis methods that can be used to correlate multiple parameters in the test data to more accurately determine when a significant error in measuring the camo effectiveness has occurred. The multivariate analysis processes, in general, involves constructing a vector of measured parameters such as the camo parameters, location on the background image, or user demographic parameters and correlating those measurements against a constructed matrix of correlation values between pairs of parameters. The resulting calculation is compared against an expected deviation value based on the number of parameters being measured. If the calculation is less than or equal to this expected deviation value, then the camouflage is considered to be effective and within acceptable parameters. Thus, even if one or two measurements fall outside the control limit, the full vector of measurements may not fall outside the control limit, and thus a much lower rate of false alarms may arise.

Figure 8:
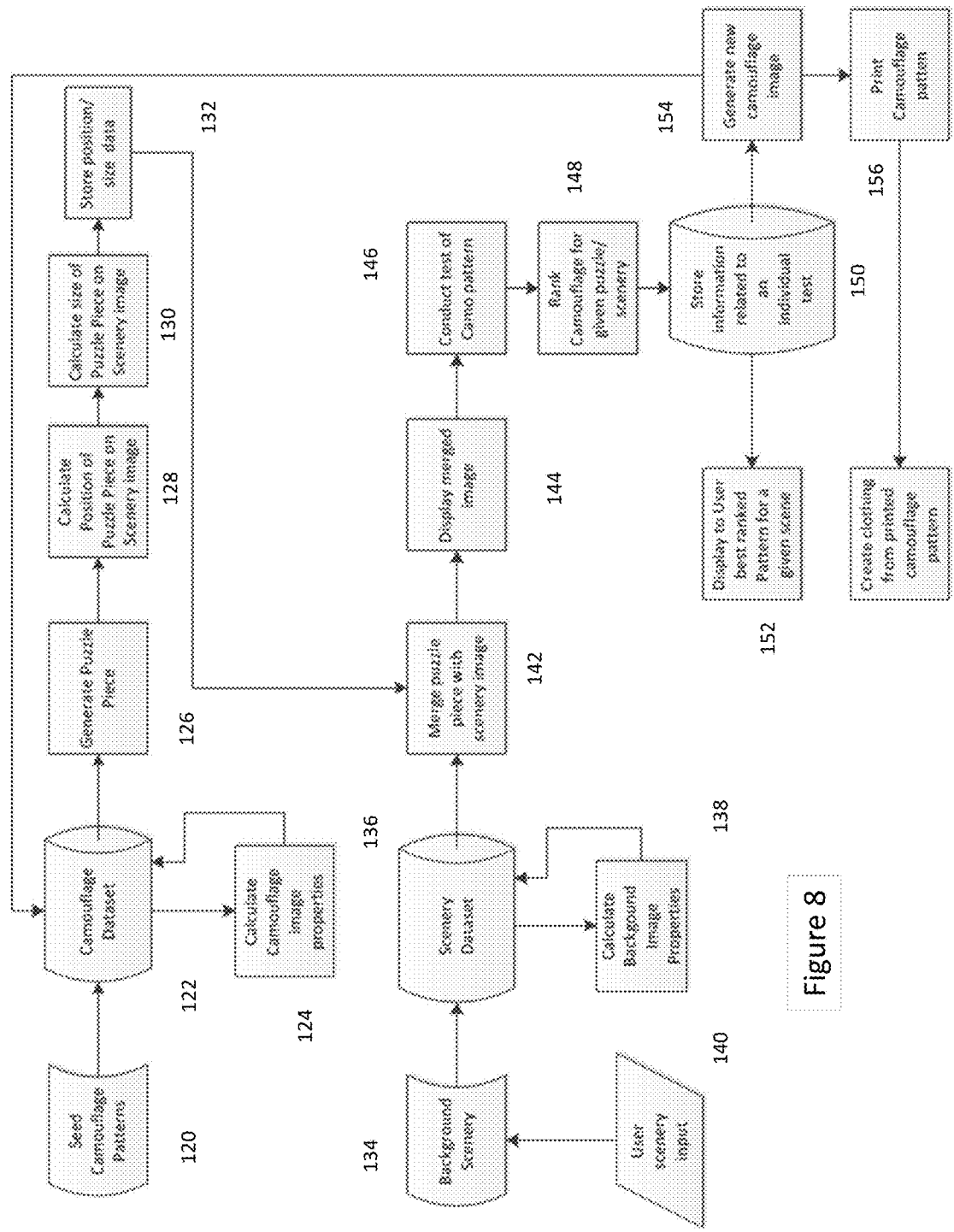

FIGS. 8-12 represent flow charts of the methods used to determine the effectiveness of the camouflage pattern. As shown in FIG. 8, seeds of camouflage baseline color and pattern patterns which can be based on natural or animal patterns are adapted to and scored to determine the effectiveness of the new pattern. At 120, seeds of camouflage baseline are stored in the camouflage dataset 122. Image properties related to the seed images are calculated at 124 and stored in the camouflage dataset 122. A portion of the camouflage pattern being evaluated is used to generate a puzzle piece or icon at 126. At 128, the system calculates a position for placement of the puzzle piece or icon onto background a scenery image. At 130, the system calculates a minimum size of the puzzle piece which can be displayed on the image an still keep all of the features of the camouflage. Information related to the image being evaluated are stored at 132.

At 134, background images are stored in the scenery dataset 136. Image properties related to the seed images are calculated at 138 and stored in the scenery dataset 136. The background scenery 134 can be 2d, 3d, or 360 degree images. A portion of the camouflage pattern being evaluated is used to generate a puzzle piece or icon at 126, which is merged onto the scenery image at 142.

The merged image 142 is displayed for a user to evaluate at 144. At this point, the image tests are being conducted 146. After the evaluation, the rank or score of a particular camouflage being evaluated is assigned for a particular user, background, and location on the background at 148. Each camouflage pattern will be evaluated a statistically significant (more than 50) number of times. To do this, Bayesian approach to alteration and evaluation.

$$P(A|B) = \frac{P(B|A)P(A)}{P(B)}$$

$$= \frac{P(B|A)P(A)}{\sum_{i=1}^{n}[P(B|A_i)P(A_i)]}$$

The probability of a new pattern being effective can be determined using Bayesian Analysis, namely, the rank for a camo pattern will include its probability or rank of observation for a given background. This information is stored at 150 which can be used to generate a fabric or clothing using the camouflage for a given area represented by the scene 152. At 154, the image can be used as a seed for the generation of new camouflage pattern.

Figure 9:
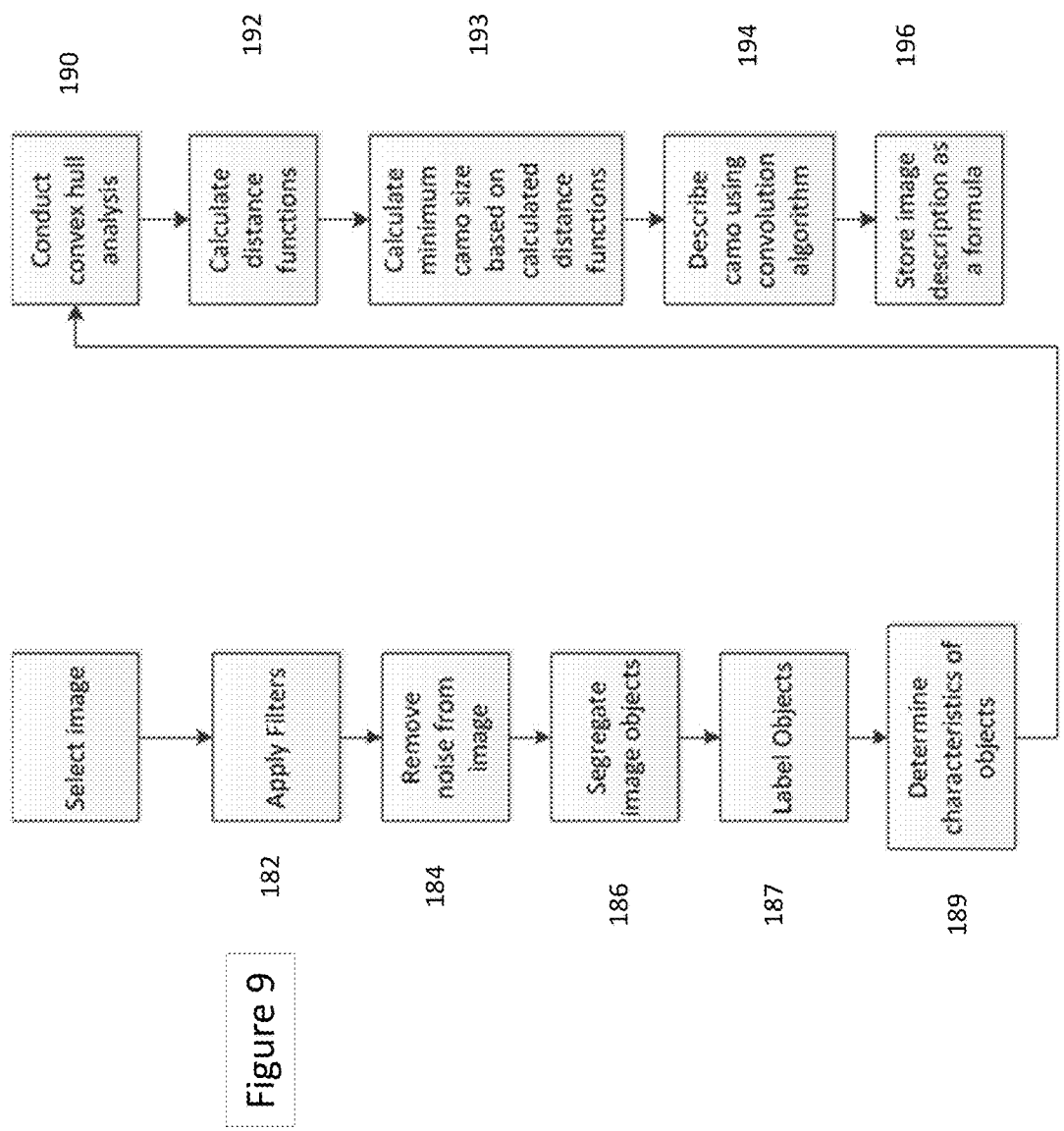

FIG. 9 represents the preparation of the background and camouflage images. At 182, the images are filtered using filters such as a mode filter, a rank order filter, or median filter. Next, noise removal occurs at 184 using Gaussian, and sharp-unsharp masking and rank order filter. At 186, shapes within the scenery or camouflage image are segregated and evaluated. At 187 the objects are labeled characterized at 189. Optionally, a convex-hull analysis is conducted to characterize the objects within the image 190. At 192, distance functions for the objects are calculated to define skeleton functions to determine the minimum size puzzle piece at 193. At 194, convolution algorithm is used to describe the components of the camouflage and the scenery. The information is stored in the database 122.

Figures 10, 11:
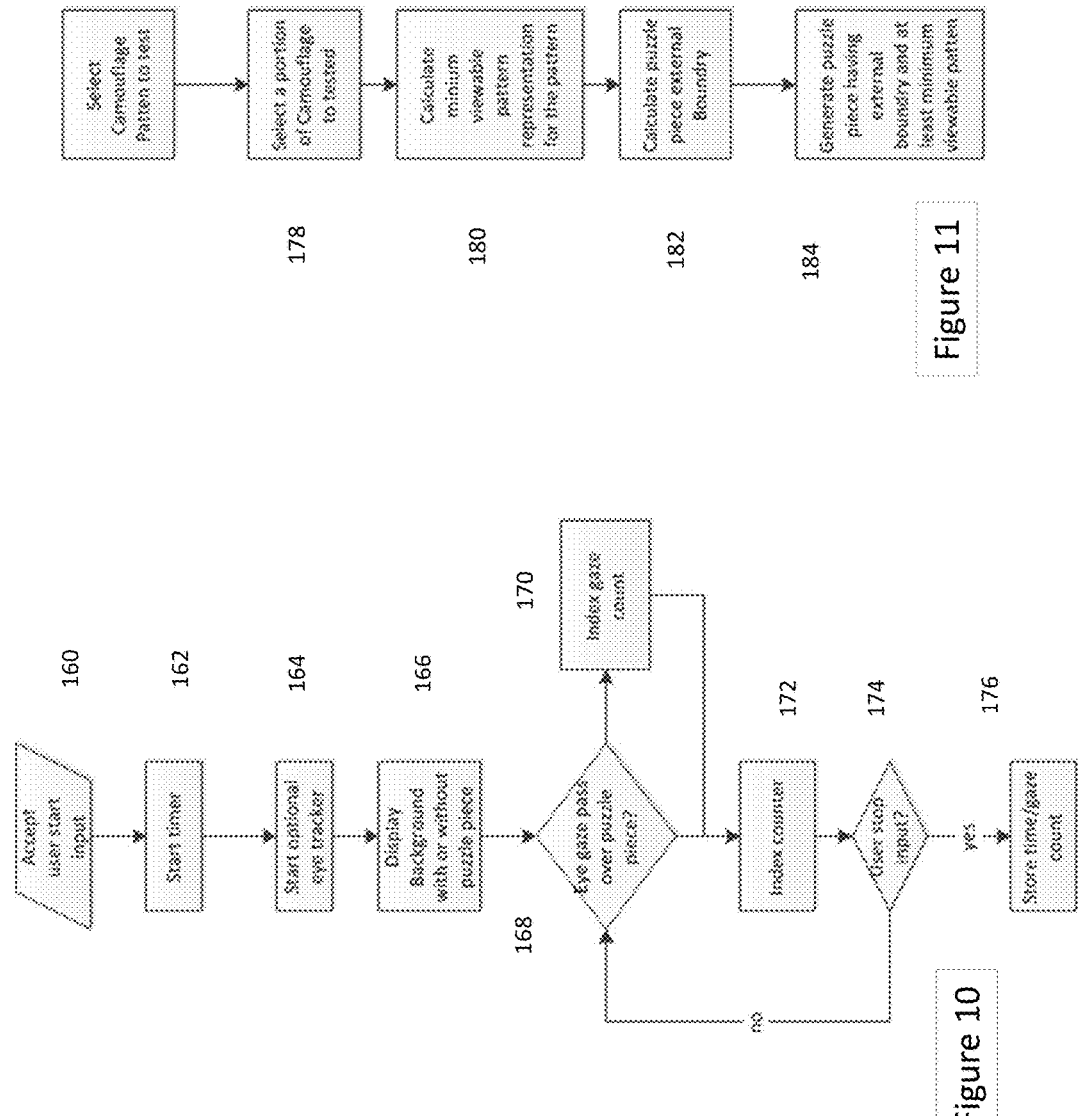

FIG. 10 depicts a method the system uses to evaluate a camouflage pattern 146. A user indicates an interest to evaluate a camouflage pattern at 160, which starts a timer at 162. At this point, the optional eye tracker, mouse tracker, and screen sensor are initiated at 164. The scenery image with or without the puzzle piece is displayed on the screen 166. The system determines if an input optional eye tracker, mouse tracker, and screen sensor indicates that the user has passed over the camouflage image on the scenery at 168. If it has passed over the camouflage image on the scenery the gaze count is indexed at 170 while the counter is indexed at 172. The system determines if a user input indicates that the user has detected the camouflage image on the scenery at 174. If the user stop input is detected, the clock is stopped and stored at 176.

FIG. 11 describes the selection of a portion of the camouflage pattern being evaluated is used to generate a puzzle piece or icon 126. The system selects a portion of camouflage to tested. The system 100 then calculates a minimum viewable pattern representation for the pattern at 180. At 182, the system selects or generates calculate a puzzle piece external boundary. The system generates puzzle piece having external boundary and at least minimum viewable pattern. Depending on the scenes being evaluated, the size of the puzzle piece can be increased and shown on the background image.

FIG. 12 represents the generation of a new camouflage pattern 154. To alter the image, several methodologies can be used. In this regard, a single color saturation, color tones, basic shapes, shape arrangements, etc. can be altered. This can include for instance a random walk change for these various components of a camo pattern. Alternatively as described below, a genetic algorithm (either one or two parent) can be used to modify to camouflage pattern.

The system 100 selects a camouflage pattern to be modified at 200. As described above, the camouflage pattern is described by a convolution algorithm which can include details about the feature in the pattern. Additionally, information about the patterns parent or parents as well as the effectiveness of the pattern in previous runs can be stored. This can include pointers to demographic information of users tested as well as the backgrounds or portions of sceneries as well as geographic information related to scenery.

In block 202, the system 100 selects features from the convolution algorithm are adjusted, to produce an amended camo design 204. This design is then tested as described above at 206. In block 208, the convolution data is determined for the new camo design and stored. The system determines in block 210 if the rank is improved. If the rank is not improved, the camo is disposed of in 211. The system then determines if the new camo design needs to be rescaled in process block 212. The system determines if the stop criterion is met to shut down the evaluation in process block 214.

Figure 13:
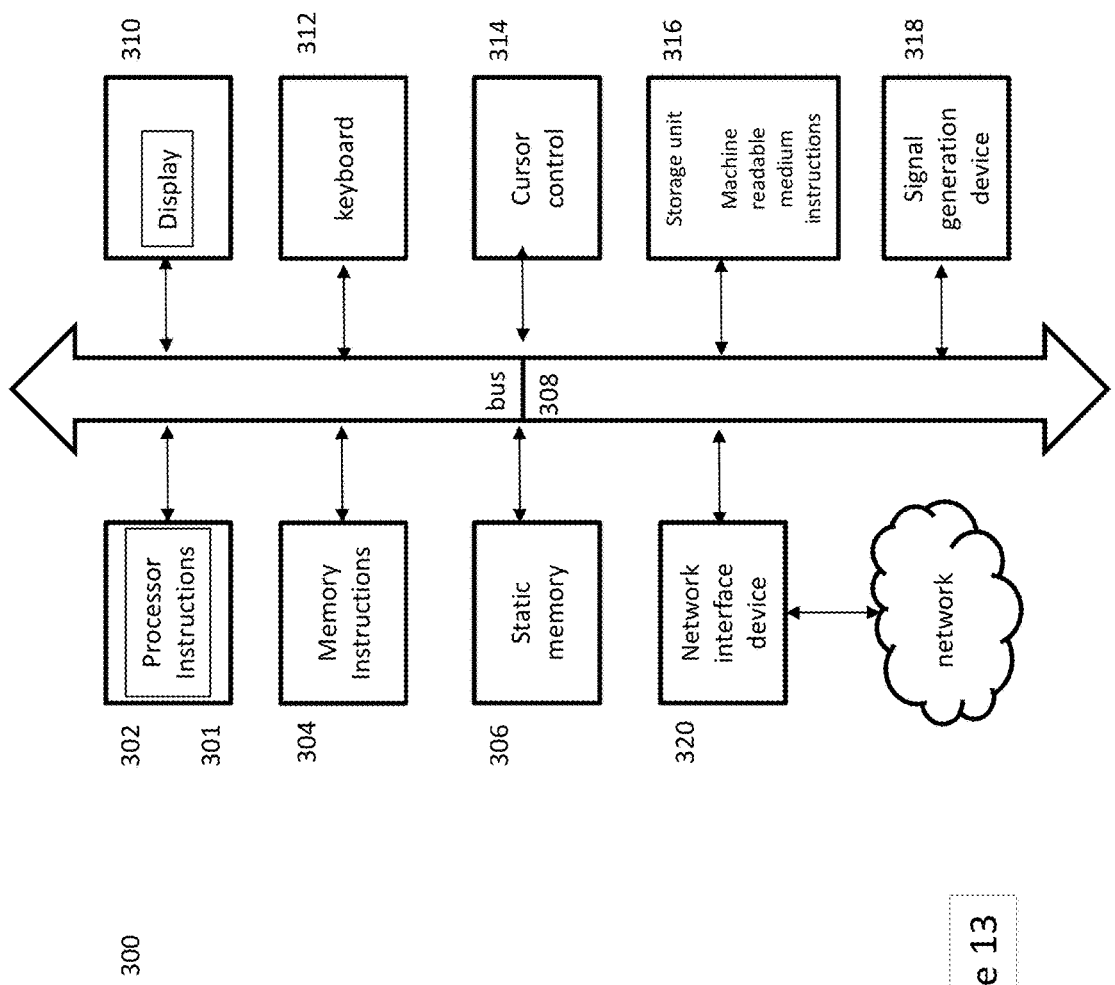
FIG. 13 is a block diagram illustrating components of an example specialized machine able to read instructions from a machine-readable medium and execute them in a processor (or controller), as an example of the camouflage evaluation system.

FIG. 13 is a block diagram illustrating components of an example specialized machine able to read instructions from a machine-readable medium and execute them in a processor (or controller), as an example of the camouflage evaluation system 100. Specifically, FIG. 13 shows a diagrammatic representation of a machine in the example form of a computer system 300 within which instructions 302 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 301 (sequential or otherwise) that specify actions to be taken by that machine. Further, while only a single machine is illustrated, the term "machine" shall also be taken to include any collection of machines that individually or jointly execute instructions 324 to perform any one or more of the methodologies discussed herein.

The example computer system 300 includes one or more processors 302 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 304, and a static memory 306, which are configured to communicate with each other via a bus 308. The computer system 300 may further include graphics display unit 310 (e.g., a plasma display panel (PDP), a liquid crystal display (LCD), a projector, or a cathode ray tube (CRT)). The computer system 300 may also include alphanumeric input device 312 (e.g., a keyboard), a cursor control device 314 (e.g., a mouse, a trackball, a joystick, a motion sensor, or other pointing instrument), a storage unit 316, a signal generation device 318 (e.g., a speaker), and a network interface device 320, which also are configured to communicate via the bus 308.

The storage unit 316 includes a machine-readable medium 322 on which is stored instructions 301 (e.g., software) embodying any one or more of the methodologies or functions described herein. The instructions 301 (e.g., software) may also reside, completely or at least partially, within the main memory 304 or within the processor 302 (e.g., within a processor's cache memory) during execution thereof by the computer system 300, the main memory 304 and the processor 302 also constituting machine-readable media. The instructions 301 (e.g., software) may be transmitted or received over a network 326 via the network interface device 320.

Embodiments are described herein of various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments, the scope of which is defined solely by the appended claims.

Reference throughout the specification to "various embodiments," "some embodiments," "one embodiment," or "an embodiment", or the like, means that a particular feature, structure, or characteristic described in connection with the embodiment(s) is included in at least one embodiment. Thus, appearances of the phrases "in various embodiments," "in some embodiments," "in one embodiment," or "in an embodiment," or the like, in places throughout the specification, are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

Although at least one embodiment for a Visual Camouflage System, Research, Insights, Design, and Method of Manufacture has been described above with a certain degree of particularity, those skilled in the art could make numerous alterations to the disclosed embodiments without departing from the spirit or scope of this disclosure. Further embodiments of the present disclosure will be apparent upon review of the material. All directional references (e.g., upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of the devices. It will be further appreciated that for conciseness and clarity, spatial terms such as "vertical," "horizontal," "up," and "down" may be used herein with respect to the illustrated embodiments. Joinder references (e.g., affixed, attached, coupled, connected, and the like) are to be construed broadly and can include intermediate members between a connection of elements and relative movement between elements. As such, joinder references do not necessarily infer that two elements are directly connected and in fixed relationship to each other. It is intended that all matter contained in the above description or shown in the accompanying drawings shall be interpreted as illustrative only and not limiting.

Changes in detail or structure can be made without departing from the spirit of the disclosure as defined in the appended claims. Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

In the foregoing description, the teachings have been described with reference to specific exemplary embodiments thereof. It will be apparent to those skilled in the art that a person understanding these teachings may conceive of changes or other embodiments or variations, which utilize the principles of this teachings without departing from the broader spirit and scope of the teachings. The specification and drawings are, therefore, to be regarded in an illustrative rather than a restrictive sense.

What is claimed is:

1. A non-transitory computer-readable medium storing computer-executable instructions for determining an effectiveness of a particular camouflage pattern, the instructions executable by a computing device to:
    display a background of a user interface comprising a first image;
    display a foreground of the user interface comprising a second image, wherein the second image comprises the particular camouflage pattern;
    receive a first selection from a first user via the user interface, wherein the first selection is received at a first location and at a first time, and wherein the first selection is indicative of a first user-perceived location of the second image relative to the first image;
    calculate a first user statistic associated with the first selection; and
    determine a first effectiveness of the particular camouflage pattern based on the first user statistic.

2. The non-transitory computer-readable medium of claim 1, further comprising instructions executable to calculate the first user statistic based on a delay between a start time when the second image is displayed in the foreground and the first time.

3. The non-transitory computer-readable medium of claim 2, wherein the first image and the second image are displayed simultaneously.

4. The non-transitory computer-readable medium of claim 1, further comprising instructions executable to calculate the first user statistic based on the first location within a boundary of the second image where the first selection is received.

5. The non-transitory computer-readable medium of claim 3, wherein the particular camouflage pattern is determined to have a decreased effectiveness when the first location is near a center of the second image.

6. The non-transitory computer-readable medium of claim 3, wherein the effectiveness of the particular camouflage pattern correspondingly varies with a separation distance between the first location and a center of the second image.

7. The non-transitory computer-readable medium of claim 3, wherein the particular camouflage pattern is determined to have an increased effectiveness when the first location is within the second image and near the boundary of the second image.

8. The non-transitory computer-readable medium of claim 3, wherein the particular camouflage pattern is determined to have a increased effectiveness when the first location is outside of the second image.

9. The non-transitory computer-readable medium of claim 1, further comprising instructions executable to:
receive the first image from an image sensor that is in wired or wireless communication with the computing device; and
share the first image with a plurality of other computing devices.

10. The non-transitory computer-readable medium of claim 9, further comprising instructions executable to calculate a second user statistic associated with a second selection received from the second user via a second user interface associated with one of the plurality of other computing devices, wherein the second selection is received at a second location and at a second time, and wherein the second selection is indicative of a second user-perceived location of the second image relative to the first image.

11. The non-transitory computer-readable medium of claim 10, further comprising instructions executable to determine an effectiveness of the particular camouflage pattern based on the second user statistic.

12. The non-transitory computer-readable medium of claim 10, further comprising instructions executable to determine an effectiveness of the particular camouflage pattern based on the first and second user statistics.

13. The non-transitory computer-readable medium of claim 1, further comprising instructions executable to provide an internet link for purchasing an item that includes the particular camouflage pattern based on the first effectiveness determined for the particular camouflage pattern.

14. The non-transitory computer-readable medium of claim 1, further comprising instructions executable to determine a first geographical location associated with the first image.

15. The non-transitory computer-readable medium of claim 14, wherein the geographical location is determined based on metadata associated with the first image.

16. The non-transitory computer-readable medium of claim 14, further comprising instructions executable to determine a first gee-effectiveness of the particular camouflage pattern based on the first determined effectiveness and the first geographical location associated with the first image.

17. The non-transitory computer-readable medium of claim 1, further comprising instructions executable to determine a first demographical effectiveness of the particular camouflage pattern based on the determined first effectiveness and first demographic information associated with the first user.

18. The non-transitory computer-readable medium of claim 1, further comprising instructions executable to determine a first seasonal effectiveness of the particular camouflage pattern based on the effectiveness of the particular camouflage pattern and of first seasonal information associated with the first image.

19. The non-transitory computer-readable medium of claim 18, wherein the first seasonal information associated with the first image includes at least one of a time and date when the first image was taken.

20. The non-transitory computer-readable medium of claim 18, further comprising instructions executable to design a manufacturable camouflage pattern based on the first effectiveness of the particular camouflage pattern.

21. The non-transitory computer-readable medium of claim 20, further comprising instructions executable to order an article comprising the manufacturable camouflage pattern.

22. A method for determining a geographical effectiveness of a particular camouflage pattern, the method comprising:
receiving, with a computing device, a first image from an image sensor in communication with the computing device;
displaying a background of a user interface, wherein the background comprises the first image, and wherein the first image includes metadata associated with a geographical location where the first image was captured;
displaying a foreground of the user interface, wherein the foreground comprises a shape that includes a particular camouflage pattern;
receiving a first user selection from a first user via the user interface, wherein the first user selection is indicative of a first user-perceived location of the second image relative to the first image;
calculating a first user statistic for the first user associated with the first user selection; and
determining a first gee-effectiveness of the particular camouflage pattern based on the first user statistic and the first geographical location where the first image was captured.

23. A system for determining a demographical effectiveness of a particular camouflage pattern, comprising:
a computing device comprising processor resources and memory resources, the memory resources storing computer-readable instructions that, when executed by the processor resources, cause the processor resources to:
display a background of a user interface comprising a first image;
display a foreground of the user interface comprising a second image, wherein the second image is of a particular camouflage pattern;
receive a user selection from a user via the user interface, wherein the received selection is indicative of a user-perceived location of the second image with respect to the first image;
calculate a first user statistic for the first user associated with the received selection, wherein the user statistic is based on where within a boundary of the second image the user selection is received;
receive a user demographic associated with the user; and
determine a demographical effectiveness of the particular camouflage pattern based on the user statistic and the user demographic.

* * * * *